United States Patent
Uhl et al.

(10) Patent No.: US 12,055,701 B1
(45) Date of Patent: Aug. 6, 2024

(54) METHOD AND DEVICE FOR GENERATING MICROSCOPIC LAYER IMAGES OF 3-DIMENSIONAL FLUORESCENT OBJECTS

(71) Applicant: TILL I.D. GmbH, Planegg (DE)

(72) Inventors: Rainer Uhl, Munich (DE); Martin Schropp, Munich (DE)

(73) Assignee: TILL I.D. GMBH, Planegg (DE)

( * ) Notice: Subject to any disclaimer, the term of this patent is extended or adjusted under 35 U.S.C. 154(b) by 0 days.

(21) Appl. No.: 18/435,028

(22) Filed: Feb. 7, 2024

(30) Foreign Application Priority Data

Feb. 8, 2023 (DE) .................. 10 2023 102 991.6

(51) Int. Cl.
*G02B 21/36* (2006.01)
*G02B 21/00* (2006.01)
(Continued)

(52) U.S. Cl.
CPC ....... *G02B 21/0076* (2013.01); *G02B 21/367* (2013.01); *G06T 5/50* (2013.01); *G01N 21/6458* (2013.01); *G01N 21/6486* (2013.01); *G06T 2207/10056* (2013.01); *G06T 2207/10064* (2013.01); *G06T 2207/20221* (2013.01); *G06T 2207/20224* (2013.01)

(58) Field of Classification Search
None
See application file for complete search history.

(56) References Cited

U.S. PATENT DOCUMENTS 7,567,726 B2 * 7/2009 Westphal ............. G02B 21/125
                                                            382/274
10,012,590 B2 * 7/2018 Chu ........................ C12Q 1/686
(Continued)

FOREIGN PATENT DOCUMENTS

DE          10330716 A1    2/2005
DE      102006031177 A1    1/2008
(Continued)

OTHER PUBLICATIONS

Decision to Grant issued Oct. 24, 2023 in German Application No. 102023102991.6.
(Continued)

*Primary Examiner* — Thomas R Artman
(74) *Attorney, Agent, or Firm* — Harness, Dickey & Pierce, P.L.C.

(57) ABSTRACT

The invention relates to a method and a device for generating microscopic layer images of 3-dimensional fluorescent objects, the layer images being largely freed from interference signals from other planes. A first region of a sample is subject to a regular illumination pattern formed by a plurality of light islands, with spacing such that the excitation intensity outside the island regions approaches zero. The emission signal emitted by the sample is detected to generate a raw image of the region. The raw image being subject to interpolation of first interference signals from regions outside the illumination islands. Generating a 2-dimensional interference signal map from the interpolated interference signals; and, generating an emission image, freed from interference signals, of the object by subtracting the 2-dimensional interference signal map from the detected emission signal.

12 Claims, 8 Drawing Sheets

(51) Int. Cl.
    *G06T 5/50*           (2006.01)
    *G01N 21/64*        (2006.01)

(56) References Cited

U.S. PATENT DOCUMENTS

| | | |
|---|---|---|
| 2005/0153356 A1 | 7/2005 | Okawa et al. |
| 2006/0098895 A1* | 5/2006 | Westphal ............ G02B 21/125 |
| | | 382/274 |
| 2016/0231246 A1 | 8/2016 | Chu et al. |

FOREIGN PATENT DOCUMENTS

| | | |
|---|---|---|
| DE | 102011114500 A1 | 4/2013 |
| DE | 102018210606 A1 | 1/2020 |
| DE | 102020122605 A1 | 3/2022 |

OTHER PUBLICATIONS

Examination Report issued Aug. 21, 2023 in German Application No. 102023102991.6.

* cited by examiner

METHOD AND DEVICE FOR GENERATING MICROSCOPIC LAYER IMAGES OF 3-DIMENSIONAL FLUORESCENT OBJECTS

CROSS-REFERENCE TO RELATED APPLICATIONS

This application claims priority under 35 U.S.C. § 119 to German Patent Application No. 102023102991.6, filed Feb. 8, 2023, the entire contents of which are incorporated herein by reference.

TECHNICAL FIELD

The present invention relates to a method and a device for generating microscopic layer images of 3-dimensional fluorescent objects, the layer images being largely freed from interference signals from other planes.

BACKGROUND

The goal of fluorescence microscopic 3D imaging is to be able to clearly associate all photons detected by a microscope to a location in a 3-dimensional object space where they were generated. If this is not intended to be achieved by a sequentially scanning laser scan method, which is inherently slow and damaging to the sample, but by 2D parallel detection using an area sensor (a camera), the desired unambiguous association is extremely difficult to achieve, especially when using objectives that only have a very shallow depth of field because of their high numerical aperture. In typical biological applications, for every correctly associated photon there are often 10 photons or more that were generated at a completely different location in the 3-dimensional space. This means that the actual signal fades into a background that is much brighter than the location whose brightness is supposed to be registered.

Since in fluorescence microscopy the signal's amplitude is usually subject to Poisson statistics, the noise of the signal sought is derived from the size of the overall signal in which it is hidden, and if the signal sought is only a fraction of the overall signal measured, it can be lost in the noise of the overall signal. While a signal of 100 registered photons, which can be registered against a dark background, has a signal-to-noise ratio (S/R) of the square root of 100, i.e., of 10, this value drops to 1 against a background of 10,000 registered photons. It is not unusual for the signal of interest to be only a single-digit percentage of the background signal from other focal planes, but even if the background signal is only 10 times stronger than the actual signal, i.e., if signal modulation is 10%, the achievable S/R is still three times smaller than if the pure signal could be measured. Document DE 103 30 716 A1 discloses a method and an arrangement for eliminating stray light when using wide-field optics for imaging heterogeneously illuminated objects. Structured illumination is used to acquire and add together several images, and brightness is normalized based on the added images. Document DE 10 2006 031 177 A1 discloses a method for generating an image of a thin layer of an object using wide-field optics, in which an illumination pattern is moved over the sample and images corrected for stray light are determined by forming a difference image from captured images. Document US 2016/0 231 246 A1 discloses methods for background correction in images of biological samples, in which the intensity values of an image or a section of an image ("region of interest") are analyzed to identify background noise. Document US 2005/0 153 356 A1 discloses methods for signal correction for the evaluation of homogeneously illuminated samples, such as multiwell plates.

SUMMARY OF THE INVENTION

Accordingly, it is an object of the present invention to at least partially circumvent the disadvantages or limitations known from the prior art. The object is achieved, according to the invention, by a method, a device, a computer program and a computer-readable storage medium according to the claims. Advantageous embodiments are the subject matter of the respective subclaims.

Accordingly, the present invention discloses, in one aspect, a method for generating microscopic layer images of 3-dimensional fluorescent objects in a sample, comprising: illuminating at least a first region of the sample with a regular illumination pattern formed by a plurality of light islands, wherein the light islands in the illumination pattern are arranged with such spacing that the excitation intensity outside the island regions in the focus of the microscope's objective approaches zero, detecting an emission signal emitted by the sample; interpolation of first interference signals that originate from regions outside the emission signals corresponding to the illumination islands; generating a 2-dimensional interference signal map from the interpolated interference signals; and generating an emission image, freed from interference signals, of the object illuminated in the pattern grid by subtracting the 2-dimensional interference signal map from the detected emission signal.

In some embodiments of the inventive method, the illumination pattern may be selected in such a way that the signal-to-noise ratio is optimized, in particular depending on the sample to be examined.

In some embodiments of the inventive method, the illumination pattern may be selected in such a way that the spacing between the illumination islands is optimized with respect to a predetermined number of images to be acquired and a predetermined contrast.

In some embodiments of the inventive method, the illumination pattern may be automatically adapted, in an iterative process, to the respective sample to be examined, in order to fulfill the above criteria. In particular, an adaptable illumination unit may be used, which allows the size, number and arrangement of the illumination islands to be changed. Accordingly, above-described parameters may be determined in test image acquisitions to then change the illumination pattern where necessary.

In one embodiment, the method according to the invention may comprise repeatedly shifting the illumination pattern relative to the sample, or the sample relative to the illumination pattern, while maintaining the focal plane for illuminating a further region of the sample. The pattern is shifted relative to the sample either by moving the pattern in the plane while the sample is stationary, preferably with the aid of a pattern generator, or by moving the sample while the pattern is stationary. The process can then be repeated at the respective new position of the illumination pattern relative to the sample until a desired resolution is achieved in the resulting image by combining the individual images, or until all regions of the sample have been illuminated at least once and thus a complete image of at least a region of the sample is created by combining the individual images of the respective position.

Accordingly, an embodiment of the inventive method may further comprise additively combining the emission images, freed from interfering signals, to form a layer image of the sample in the respective focal plane.

In one embodiment of the inventive method, a measured emission signal for each individual position of the illumination pattern on the sample may be compared with an emission signal calculated using the point-spread function of the microscope used, and second interference signals may be determined based on the difference between the two signals.

In one embodiment of the inventive method, the interference signal may be further reduced by iterative deconvolution by iteratively calculating, in addition to the object signal from the islands, also the excitation intensities in the raw images, the iteration cycles for object signals and excitation intensities alternating in each case.

In one embodiment of the inventive method, interference signals may be determined with the inclusion of adjacent focal planes.

In preferred embodiments of the inventive method, the illumination pattern may be configured in such a way that the area of the illumination islands in the focal plane is between 5 and 20% of the total area illuminated by the pattern in a measuring process.

In one aspect the invention further relates to a device for generating microscopic layer images of 3-dimensional fluorescent objects in a sample, the device comprising an objective, an illumination unit for illuminating the sample in the form of an illumination pattern formed by a plurality of light islands, wherein the light islands in the illumination pattern are arranged with such spacing that the excitation intensity outside the island regions in the focus of the microscope's objective approaches zero, a detector for detecting an emission signal emitted by the sample, an arrangement for shifting the illumination pattern relative to the sample, or the sample relative to the illumination pattern, and at least one control unit, wherein the device is configured to carry out the methods described above.

In one aspect the invention relates to a computer program comprising instructions which, when the program is executed by a computer or preferably on a device as described above, cause the computer or the device to perform one of the methods described above.

In one aspect the invention relates to a computer-readable storage medium that includes instructions which, when executed by a computer or preferably on a device as described above, cause the computer or the device to perform one of the methods described above.

BRIEF DESCRIPTION OF THE FIGURES

Further aspects of the invention will be apparent from the following detailed description of preferred embodiments and the accompanying figures.

FIGS. 3(A) and 3(B) to 13(A) and 13(B) show examples of the method according to the invention being applied to image data;

FIGS. 14(A) and 14(B) to 18(A) and 18(B) show filter functions for interpolating the interference signal.

DETAILED DESCRIPTION

Figure 1:
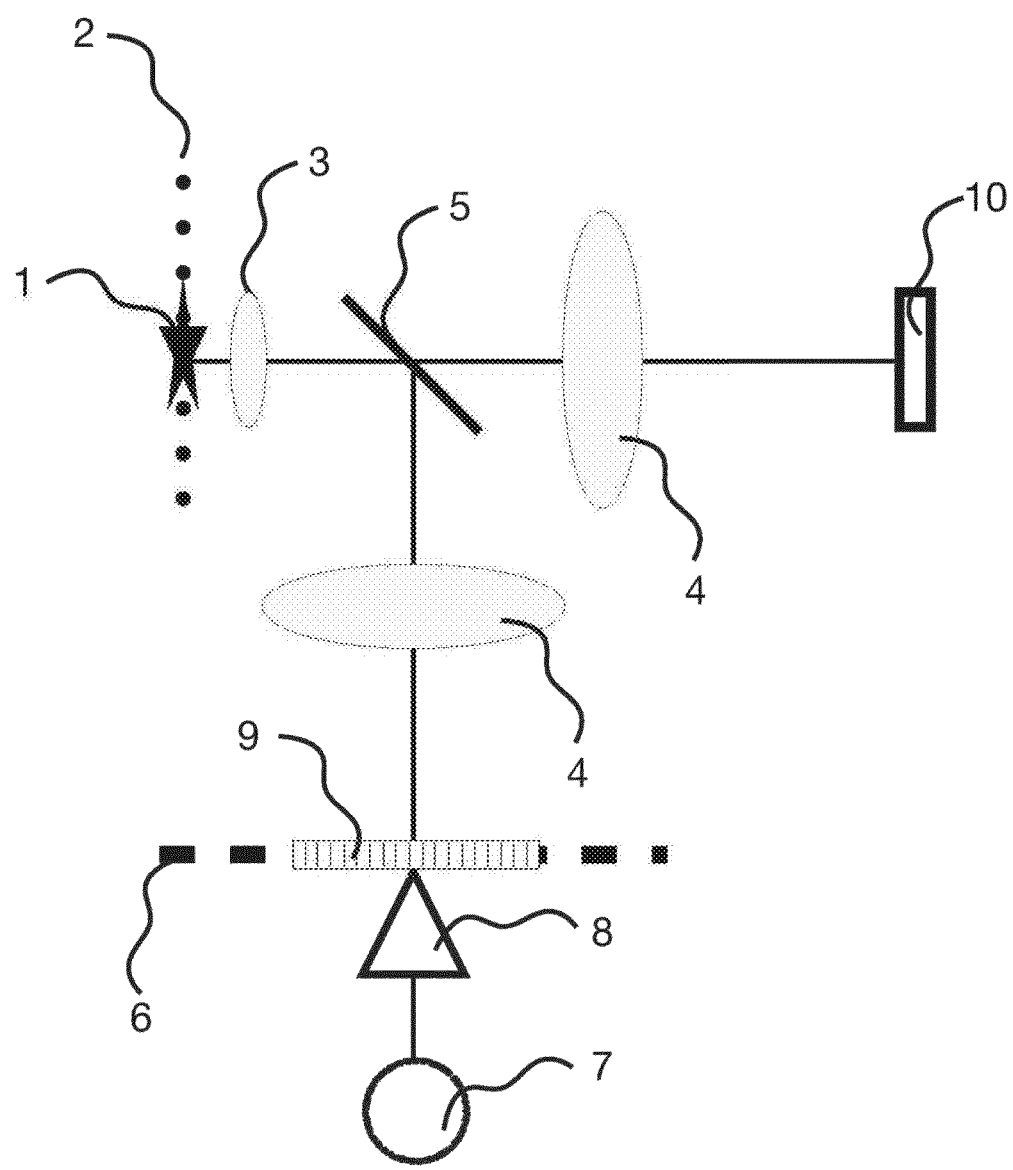
FIG. 1 shows part of a device according to the invention.

The interfering background may be reduced by acquiring a raster image in which only representative island-shaped sample areas in the respective focal plane of the objective are illuminated (excited) instead of the entire sample. For this purpose, as described in DE 10 2011 114 500 A1, illumination islands are used which are arranged in a regular checkerboard pattern or hexagon pattern. According to the present invention, "intensity trenches" between the excitation islands are selected in such a way that no excitation can occur at their deepest points. The intensity profiles then measured are compared with the known phase position or position of the exciting pattern and, based on the comparison, a two-dimensional "interference map" is created which can be subtracted from the measured intensity profile to obtain a largely "undisturbed" raster image.

Since the process according to the invention works not only with illumination islands of diffraction-limited size, but also if the islands of the illumination pattern are significantly larger, i.e., if the raster is coarser, the island size is another parameter that may be considered when determining the optimum pattern for a given sample.

The S/R of a raster image freed from interference according to the invention is affected by background noise in two ways. Firstly because the location-dependent measured intensity from the interior of the island contains the root sum of the noise contributions of the desired signal and of the interference signal, and secondly because the interference signal to be subtracted is also noisy. While, in order to obtain an "island image" with the highest possible resolution, it is usually undesirable to subject the signal from the interior of the island, measured based on the location, to spatial filtering, this can certainly be done for the subtrahend to make the interference map largely noise-free.

The information on how strongly the S/R of the raster image freed from interference is still affected by remaining noise contributions from light from other planes can be deduced from the "depth of the trenches" between the measured "emission islands". Based on a "trial measurement", the "trench depth" can be used to determine the parameters of island size and island spacing that will result in an optimal compromise between the maximum S/R on the one hand and the most representative raster possible on the other for a given specimen. If the islands are too far apart, temporal resolution is lost, because more raw images have to be acquired. If they are too close to each other (wide-field image acquisition as a borderline case), the interference signal dominates the image and the illumination trenches can no longer be measured. According to the invention, this optimal compromise cannot only be determined, but also experimentally adjusted.

If the image is acquired in such a way that a spatially symmetrical trench depth results around the illumination islands, the illumination grid will also be designed symmetrically. Slit-confocal image acquisition as in DE 10 2011 114 500 A1, on the other hand, results in an asymmetrical emission profile around the illumination islands. For a spatially homogeneous S/N, in this case, a correspondingly compressed illumination grid can be used, i.e., the island spacing can be made narrower in the scan direction than perpendicular to it.

Once a "disturbance-corrected raster image" has been generated using the above procedure, a finer raster can be provided by repeating the above procedure several times with a correspondingly changed pattern position relative to the sample, and if the respective pattern positions are chosen accordingly, a sample can be completely scanned with a calculable number of pattern shifts; i.e., according to the invention, a layer image of the respective focal plane of the objective is obtained by summing the disturbance-corrected raster images.

A 3D (raster or total) image is achieved by repeating the above procedure to obtain layer images in more than one focal plane. If complete volume-scanning rasterization is unnecessary because it would generate too much image data, the pattern of each individual layer image can be offset relative to the plane below. However, if a particularly true-to-life interference map for a plane is intended to be obtained by including the planes below and above, it is advisable to generate the image stack without laterally shifting the pattern on the sample.

The relative movement of the pattern and the sample can be achieved either by exciting a stationary sample using a movably designed illumination grid or by moving the sample through a stationary illumination grid.

The proposed approach is different from the prior art in that the desired signal is not generated by cutting out, i.e. omitting, undesirable signal contributions, as the confocal aperture of a spot scanner does, or the plurality of confocal pinholes in a spinning-disk system; instead, the invention generates images not only based on the signal originating from the regions of the excitation islands, but also the measured "interference signal" between the excitation islands, so as to remove from the signal measured within the islands a large part of the interference signal from planes above and below the focal plane in advance further calculations.

For this purpose, the interference signal registered outside the illumination islands is interpolated to the entire image field. This results in a two-dimensional interference map, which is subtracted from the respective emission pattern images to generate for each pattern position an image largely free from out-of-focus interference. The island regions can then additionally be used as digital confocal filters to remove noise from the out-of-focus planes. The sample images generated in this way (raw images) are subsequently added together to form a layer image. In the case of filtering with digital pinholes, the calculation takes into account that not every pixel receives the same amount of light from the pinholes across all pattern positions.

The information contained in the raw images can be further utilized to determine the interference even more precisely by comparing the measured emission signal for each individual position of the illumination pattern on the sample with the emission signal calculated by the point-spread function of the microscope.

The interference signal remaining in the raw images after the subtraction can be further reduced by iterative deconvolution. This can be done by iteratively calculating both the object signal from the islands and the excitation intensities in the raw images, with the iteration cycles for object signals and excitation intensities alternating in each case (ping-pong iteration).

In the simplest case, the calculation of the pattern deconvolution is limited to a two-dimensional pattern image acquired in a focal plane (no neighbor), but can also be generated—with more mathematical effort—by including neighboring focal planes (nearest neighbor). Consequently, an entire pattern stack can be acquired, deconvolved in 3 dimensions and then assembled to a 3D image by addition to other pattern stacks shifted in the x/y direction.

The number of raw images required for a given pattern in order to uniformly scan the entire detector surface depends on the type of pattern (checkerboard or hexagonal), the shape and size of the exciting light islands, their respective grid spacing and thus the respective fill factor of the pattern. In the case of uniform planar illumination, in which the point-spread function of the resulting emission pattern is symmetrical, an excitation pattern that is also symmetrical will be selected, whereas in the case of slit-shaped illumination with slit-confocal detection (as in DE 10 2011 114 500 A1), the grid spacing can be reduced in the direction of slit movement and, if necessary, be spread perpendicular to it.

According to the invention, the microscope shown in FIG. 1 illuminates the examined object 1 in the focal plane 2 of an objective 3, using a tube lens 4 and a color splitter 5 to image the image plane 6 on the excitation side onto the sample 1 in such a way that a sharp image of this plane 6 is formed. A pattern generator 8 fed by a light source 7 generates the desired pattern 9 in plane 6, and a camera 10 records in the image plane of the microscope the emission pattern generated by the reduced image of the illumination pattern 9 in the object plane 2. Shifting of the pattern 9 relative to the examined object 1 takes place either by shifting the pattern in plane 6 using the pattern generator 8 while the examined object 1 is stationary, or by shifting the examined object 1 while the pattern 9 is stationary.

Figure 2:
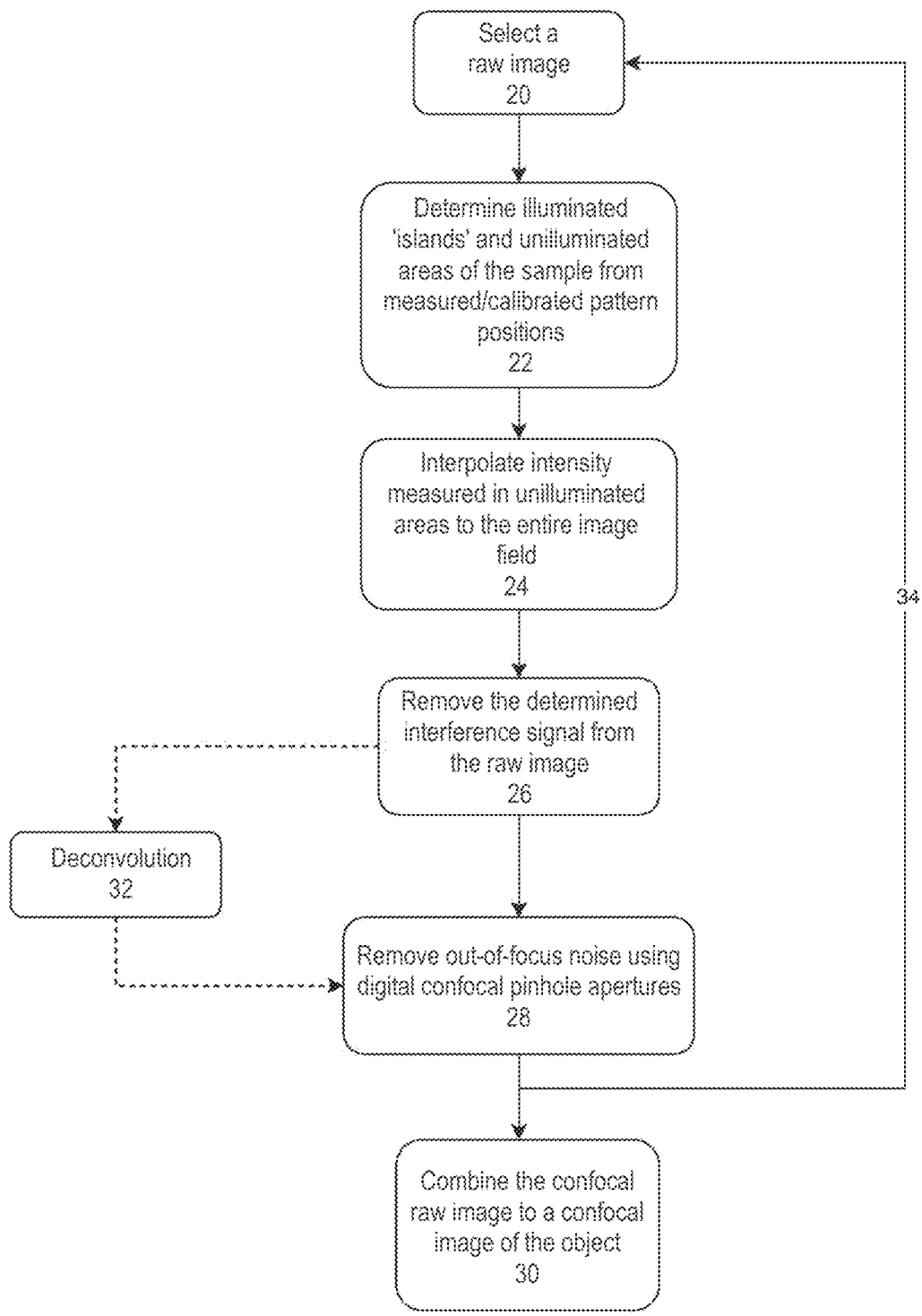
FIG. 2 shows the sequence of the method according to the invention.

FIG. 2 schematically shows the sequence of the inventive method which, starting with step 20, is applied to each raw image, i.e., to each image in a position of the illumination pattern relative to the examined object (or sample), with the examination object being illuminated as described above, in particular in connection with FIG. 1, and the resulting emission signal being detected with a suitable detector. Subsequently, in step 22 of the inventive method, the illuminated "islands" and unilluminated areas of the sample are determined from measured/calibrated sample positions. Based on this, any signals in the unilluminated areas of the sample are interpolated in step 24 of the method, thus determining an interference signal. This is based on the assumption that no signal should be present in unilluminated areas and therefore all signals detected in these regions are by definition interference signals. The interference signals determined in this way are subtracted from the raw image in step 26, thereby removing the interference signals from the raw image. Further, out-of-focus noise contained in the image may be removed in step 28 using the island regions as digital confocal filters. Optionally, the method may be extended by deconvolution in step 32 as described in detail above. This is done, according to the invention, by comparing the measured emission signal for each individual position of the illumination pattern on the sample with the emission signal calculated by the PSF of the microscope, thus determining another interference signal, by which the respective image can be corrected. The inventive method is repeated for each position of the illumination pattern relative to the sample (step 34). Subsequently, in step 30, the individual raw images, which each correspond to a position of the illumination pattern relative to the sample and thus each represent a partial region of the sample, can be combined to form a complete confocal image of the sample or the examined object. By repeating the process in different focal planes, three-dimensional reconstructions of the examined object can be generated by combining the individual layer images.

Figure 3A:
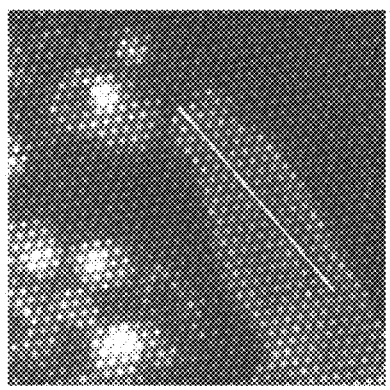
Figure 3B:
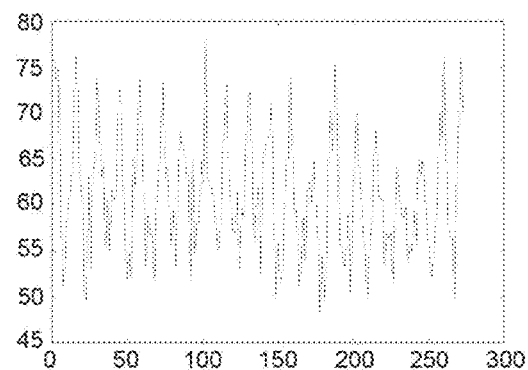
Figure 4A:
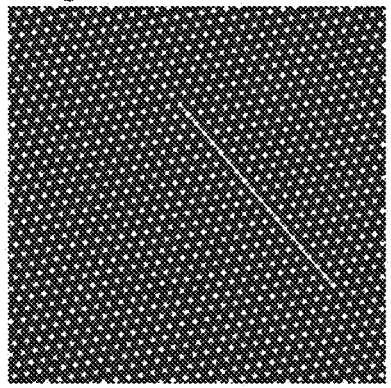
Figure 4B:
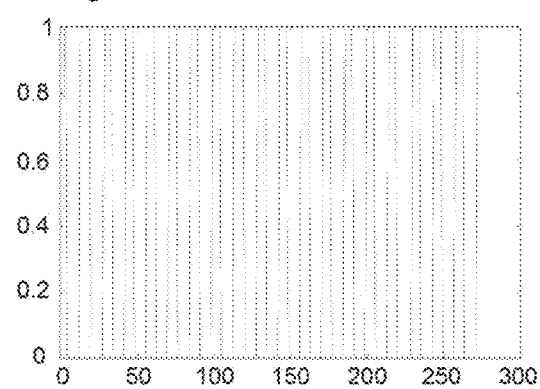
Figure 5A:
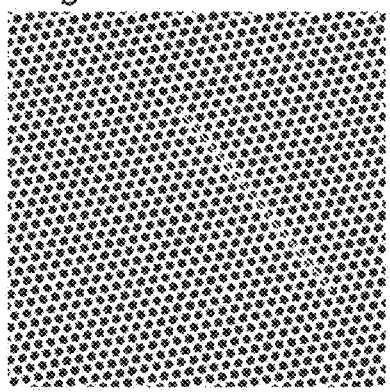
Figure 5B:
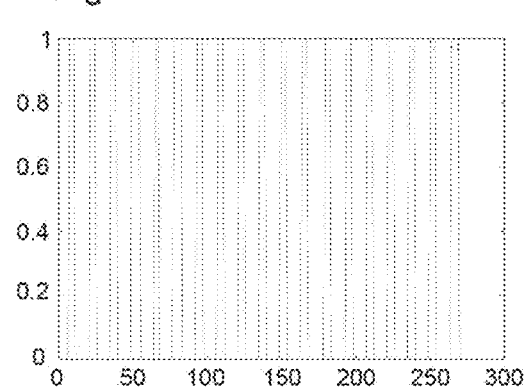
Figure 6A:
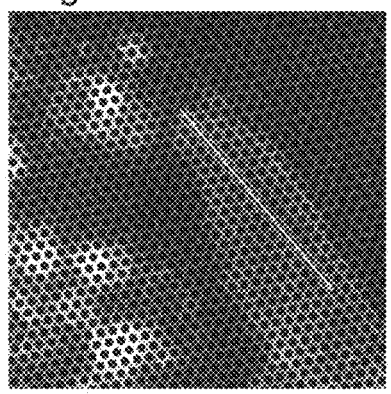
Figure 6B:
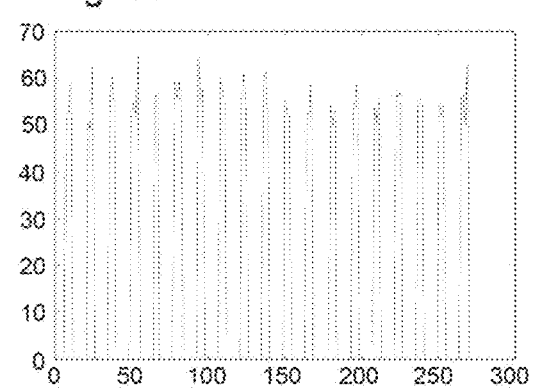
Figure 7A:
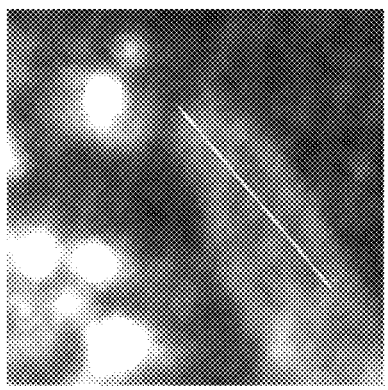
Figure 7B:
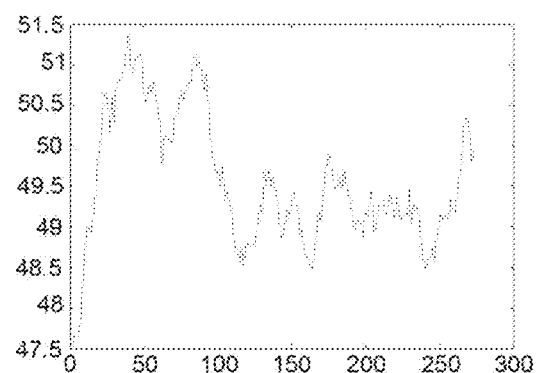
Figure 8A:
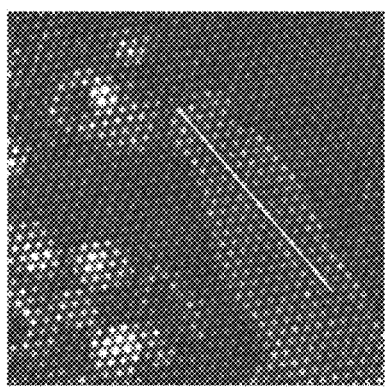
Figure 8B:
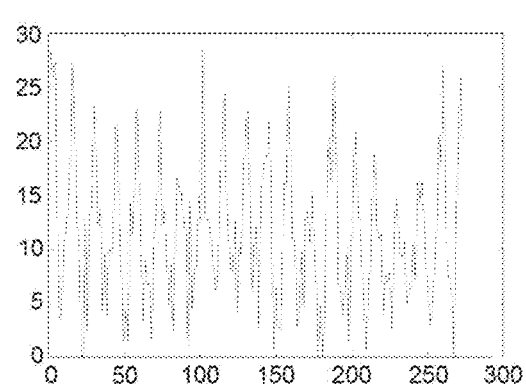
Figure 9A:
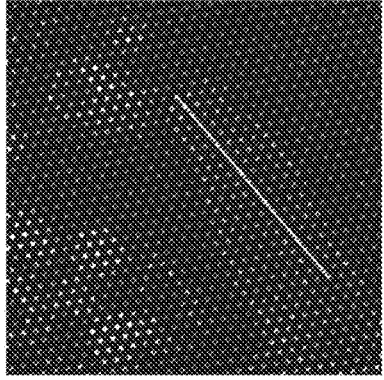
Figure 9B:
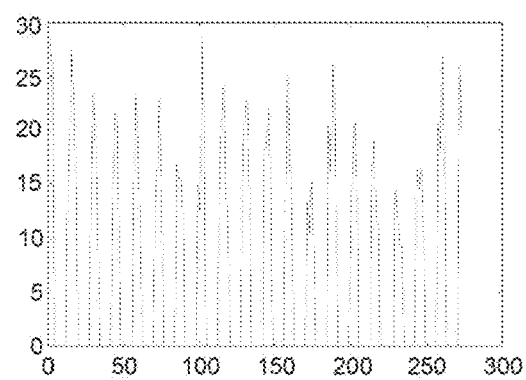
Figure 10A:
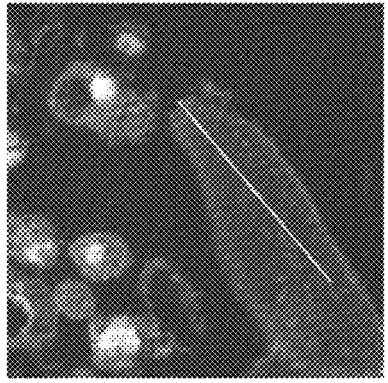
Figure 10B:
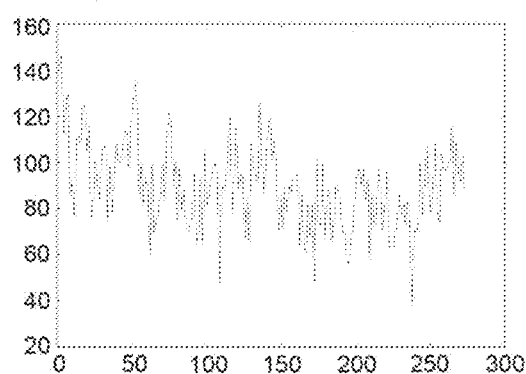
Figure 11A:
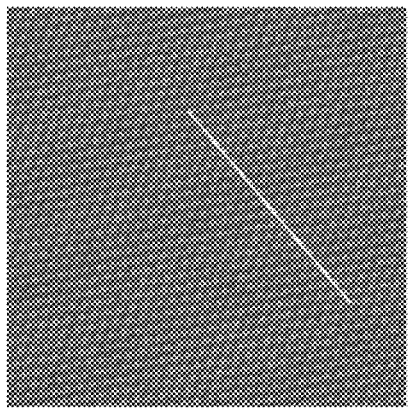
Figure 11B:
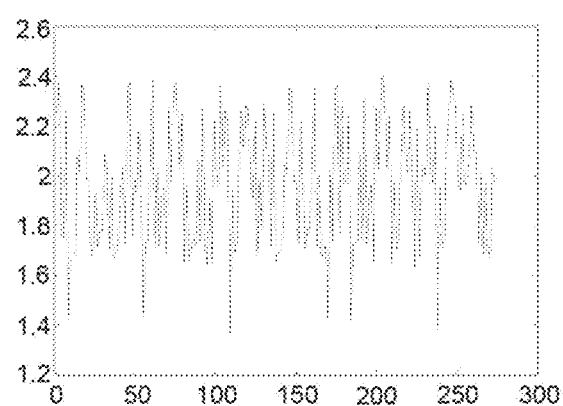
Figure 12A:
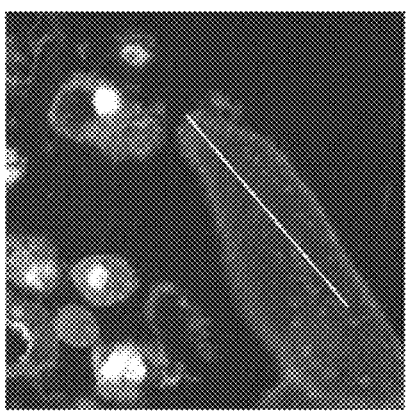
Figure 12B:
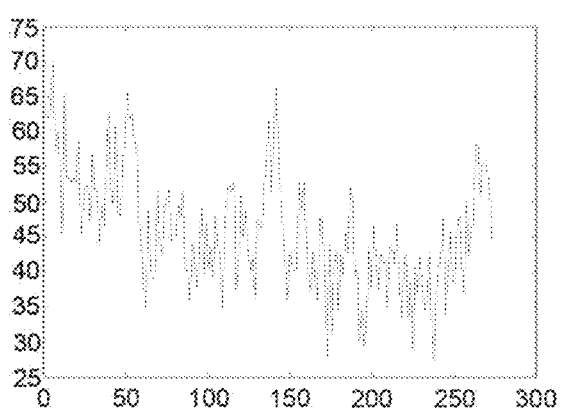
Figure 13A:
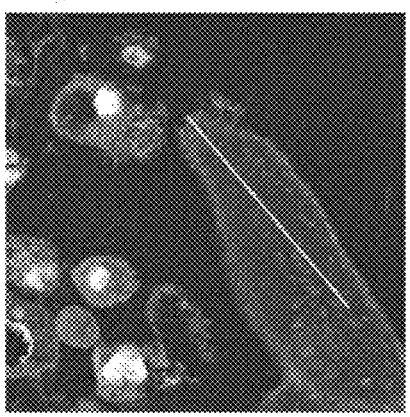
Figure 13B:
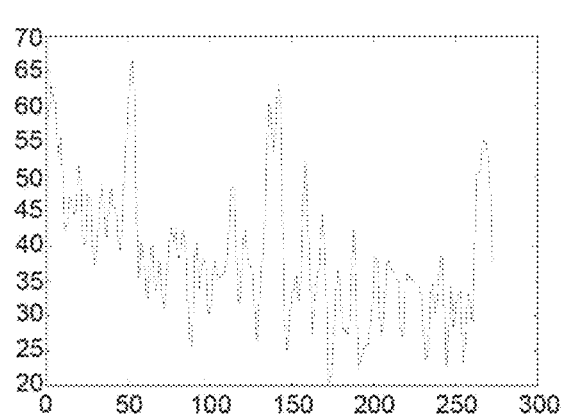

FIGS. 3(A) and 3(B) to 13(A) and 13(B) show the application of the inventive method, with figures "A" each showing the image data and figures "B" each showing the line plot of an intensity profile for the white line in the corresponding figure "A". FIGS. 3(A) and 3(B) show the first raw image (a microscopic image of an oral bacterial biofilm of a periodontitis patient). FIGS. 4(A) and 4(B) show the island regions of the illumination pattern where the sample in focus was fully excited. FIGS. 5(A) and 5(B)

show the regions outside the illumination islands. FIGS. 6(A) and 6(B) show the signal of the raw image of FIGS. 3(A) and 3(B) from the regions outside the illumination islands. FIGS. 7(A) and 7(B) show the interpolated interference signal/out-of-focus signal of FIGS. 6(A) and 6(B). FIGS. 8(A) and 8(B) show the raw image of FIGS. 3(A) and 3(B) minus the interference signal of FIGS. 7(A) and 7(B), i.e., the "corrected in-focus signal". FIGS. 9(A) and 9(B) show the corrected in-focus signal after it has been filtered with digital pinholes (corresponding to the island regions of FIGS. 4(A) and 4(B)). The steps described in FIGS. 3(A) and 3(B)-9(A) and 9(B) can be repeated for all raw images, i.e., raw images with different positions of the illumination pattern relative to the sample. Subsequently, the steps of the inventive method described in FIGS. 10(A) and 10(B)-13(A) and 13(B) may be carried out. FIGS. 10(A) and 10(B) show the summed, adjusted, filtered in-focus signal as a confocal image of the sample. FIGS. 11(A) and 11(B) show an optional correction frame that can be used for further corrections in cases where, downstream from the digital pinhole filter, the same amount of signal from the raw images is no longer received by all pixels of the resulting image. FIGS. 12(A) and 12(B) show the optional step in which the confocal image of FIGS. 10(A) and 10(B) have been divided by the correction frame of FIGS. 11(A) and 11(B) or a "pinhole correction" has been performed. FIGS. 13(A) and 13(B) show a resulting corrected and Wiener-filtered confocal image.

The number of shifts of the illumination pattern relative to the sample required to achieve the desired illumination of the sample and thus a desired resolution of the raster image generated by summing the individual images depends on the type of illumination pattern.

In this context, the minimum number of necessary shifts of the illumination pattern relative to the sample (or of the sample relative to the illumination pattern) for obtaining a desired scan of the sample can be calculated as a function of the pattern (e.g., hexagonal or checkerboard pattern) according to the following formulas.

Formula 1 describes the frequency vectors of the hexagon defined by the indices m and n from Table 1. For all frequencies, (m+n) must be even.

$$\vec{k}_{(m,n)} = \frac{\pi}{p}\begin{pmatrix}\sqrt{3}\,m\\n\end{pmatrix}$$ Formula 1

Formula 2 describes the frequency vectors of the checkerboard pattern defined via the indices m and n from Table 2. For all frequencies, (m+n) must be even.

$$\vec{k}_{(m,n)} = \sqrt{2}\frac{\pi}{p}\begin{pmatrix}m\\n\end{pmatrix}$$ Formula 2

Formula 3 determines the magnitude of the frequency in units of the fundamental frequency.

$$|\vec{k}_{(m,n)}|/\left(\frac{2\pi}{p}\right)$$ Formula 3

Formula 4 can be used to calculate the shifting direction (\vec \Delta) of the hexagon from parameter kappa (which defines the direction) shown in Table 1.

$$\theta = \arctan\left(\frac{\sqrt{3}}{2\kappa+1}\right)$$ Formula 4

Formula 5 can be used to calculate the shifting direction (\vec \Delta) of the checkerboard pattern from parameter kappa (which defines the direction) shown in Table 2.

$$\theta = \arctan\left(\frac{1-\kappa}{1+\kappa}\right)$$ Formula 5

Formula 6 defines the relative phase shift of the respective frequency k_m,n (see Table 1, column H) for the hexagon.

$$\Delta\Phi_{(m,n)}^{hexagon\ relative} := \frac{\vec{k}_{(m,n)}\cdot\vec{\Delta}}{\vec{k}_{(0,2)}\cdot\vec{\Delta}}$$ Formula 6

Formula 7 defines the relative phase shift of the respective frequency k_m,n (see Table 2, column H) for the checkerboard pattern. For the values of kappa (column G) listed in Table 2, the values of the relative phase shifts are non-zero integers (natural numbers).

$$\Delta\Phi_{(m,n)}^{checkerboard\ relative} := \frac{\vec{k}_{(m,n)}\cdot\vec{\Delta}}{\vec{k}_{(1,1)}\cdot\vec{\Delta}}$$ Formula 7

Formula 8 can be used to calculate the minimum number of raw images to be acquired for a given set of frequency vectors included in the excitation for an artifact-free evaluation (or error-free scanning of the sample). The set of frequency vectors included in the excitation is represented by quantity M in Formula 8. The minimum number of raw images required for an error-free evaluation results from the smallest natural number that is not included in the set of relative phase shifts for the frequencies of the quantity M.

$$N_{min.} = \min(\{n \in \mathbb{N}\backslash\{\Delta\Phi_{(m,n)}^{realative}\,|\,(m,n)\in\mathbb{M}\}\})$$ Formula 8

Table 1 shows the possible pattern orientations and the necessary (minimum) number of shifts or raw images for a hexagonal illumination pattern. Column A shows the pattern period in units of the minimum possible/resolvable period of lambda/(2*NA); column B shows the normalized pattern frequency; analogous to A, lambda/(NA*p); it can therefore be between 0 and 2 (edge of the OTF); column C correspondingly shows the maximum number of frequency orders that a raw image can contain; columns D, E show the indices (D: m, E: n) which define the pattern frequencies as \vec k=pi/p*[m, n]; column F shows the magnitude of the respective frequency in units of the fundamental frequency 2pi/p (i.e., the value is always the same as in column A); column G shows the parameter kappa, which defines the pattern orientation as theta=arctan(sqrt(3)/(2*kappa+1); column H shows the phase shift of the respective frequency relative to the phase shift of k1 (the frequency in row 2). This value should never be 0; this condition defines the minimum value of kappa; column I shows the minimum number of raw images for a configuration or pattern period; column J shows the orientation angle of the pattern theta relative to the x-axis; column K shows the absolute travel distance of the pattern over N raw images in units of the pattern period p.

| A | B | C | D | E | F | G | H | I | J | K |
|---|---|---|---|---|---|---|---|---|---|---|
| 1 | 2 | 7 | 0 | 2 | 1 | 1 | 1 | 3 | 30 | 2 |
| | | | 1 | −1 | 1 | 1 | 1 | | 30 | 2 |
| | | | 1 | 1 | 1 | 1 | 2 | | 30 | 2 |
| square root(3) | 1.2 | 13 | 1 | −3 | 1.73205081 | 2 | 1 | 6 | 19.1066054 | 3.05505046 |
| | | | 1 | 3 | 1.73205081 | 2 | 4 | | 19.1066054 | 3.05505046 |
| | | | 2 | 0 | 1.73205081 | 2 | 5 | | 19.1066054 | 3.05505046 |
| 2 | 1 | 19 | 2 | −2 | 2 | 2 | 4 | 7 | 19.1066054 | 3.05505046 |
| | | | 2 | 2 | 2 | 2 | 6 | | 19.1066054 | 3.05505046 |
| | | | 0 | 4 | 2 | 2 | 2 | | 19.1066054 | 3.05505046 |
| square root(7) | 0.8 | 31 | 1 | −5 | 2.64575131 | 3 | 1 | 12 | 13.8978862 | 4.163332 |
| | | | 1 | 5 | 2.64575131 | 3 | 6 | | 13.8978862 | 4.163332 |
| | | | 2 | 4 | 2.64575131 | 3 | 5 | | 13.8978862 | 4.163332 |
| | | | 2 | 4 | 2.64575131 | 3 | 9 | | 13.8978862 | 4.163332 |
| | | | 3 | −1 | 2.64575131 | 3 | 10 | | 13.8978862 | 4.163332 |
| | | | 3 | 1 | 2.64575131 | 3 | 11 | | 13.8978862 | 4.163332 |
| 3 | 0.66666667 | 37 | 0 | 6 | 3 | 3 | 3 | 13 | 13.8978862 | 4.163332 |
| | | | 3 | −3 | 3 | 3 | 9 | | 13.8978862 | 4.163332 |
| | | | 3 | 3 | 3 | 3 | 12 | | 13.8978862 | 4.163332 |
| 2 square root(3) | 0.57735027 | 43 | 2 | −6 | 3.46410162 | 3 | 4 | 13 | 13.8978862 | 4.163332 |
| | | | 2 | 6 | 3.46410162 | 3 | 10 | | 13.8978862 | 4.163332 |
| | | | 4 | 0 | 3.46410162 | 3 | 14 | | 13.8978862 | 4.163332 |
| square root(13) | 0.5547 | 55 | 1 | 7 | 3.60555128 | 4 | 1 | 20 | 10.8933946 | 5.29150262 |
| | | | 1 | 7 | 3.60555128 | 4 | 8 | | 10.8933946 | 5.29150262 |
| | | | 3 | 5 | 3.60555128 | 4 | 16 | | 10.8933946 | 5.29150262 |
| | | | 3 | 5 | 3.60555128 | 4 | 16 | | 10.8933946 | 5.29150262 |
| | | | 4 | −2 | 3.60555128 | 4 | 17 | | 10.8933946 | 5.29150262 |
| | | | 4 | 2 | 3.60555128 | 4 | 19 | | 10.8933946 | 5.29150262 |
| 4 | 0.5 | 61 | 4 | −4 | 4 | 4 | 16 | 21 | 10.8933946 | 5.29150262 |
| | | | 4 | 4 | 4 | 4 | 20 | | 10.8933946 | 5.29150262 |
| | | | 0 | 8 | 4 | 4 | 4 | | 10.8933946 | 5.29150262 |
| square root(19) | 0.45883147 | 73 | 5 | −1 | 4.35889894 | 4 | 22 | 21 | 10.8933946 | 5.29150262 |
| | | | 5 | 1 | 4.35889894 | 4 | 23 | | 10.8933946 | 5.29150262 |
| | | | 2 | −8 | 4.35889894 | 4 | 5 | | 10.8933946 | 5.29150262 |
| | | | 2 | 8 | 4.35889894 | 4 | 13 | | 10.8933946 | 5.29150262 |
| | | | 3 | −7 | 4.35889894 | 4 | 10 | | 10.8933946 | 5.29150262 |
| | | | 3 | 7 | 4.35889894 | 4 | 17 | | 10.8933946 | 5.29150262 |
| square root(21) | 0.43643578 | 85 | 1 | −9 | 4.58257569 | 5 | 1 | 30 | 8.94827556 | 6.42910051 |
| | | | 1 | 9 | 4.58257569 | 5 | 10 | | 8.94827556 | 6.42910051 |
| | | | 4 | −6 | 4.58257569 | 5 | 19 | | 8.94827556 | 6.42910051 |
| | | | 4 | 6 | 4.58257569 | 5 | 25 | | 8.94827556 | 6.42910051 |
| | | | 5 | −3 | 4.58257569 | 5 | 26 | | 8.94827556 | 6.42910051 |
| | | | 5 | 3 | 4.58257569 | 5 | 29 | | 8.94827556 | 6.42910051 |
| 5 | 0.4 | 91 | 0 | 10 | 5 | 5 | 5 | 31 | 8.94827556 | 6.42910051 |
| | | | 5 | −5 | 5 | 5 | 25 | | 8.94827556 | 6.42910051 |
| | | | 5 | 5 | 5 | 5 | 30 | | 8.94827556 | 6.42910051 |
| square root(27) | 0.38490018 | 97 | 3 | −9 | 5.19615242 | 5 | 12 | 31 | 8.94827556 | 6.42910051 |
| | | | 3 | 9 | 5.19615242 | 5 | 21 | | 8.94827556 | 6.42910051 |
| | | | 0 | 0 | 5.19615242 | 5 | 33 | | 8.94827556 | 6.42910051 |
| 2 square root(7) | 0.37796447 | 109 | 2 | −10 | 5.29150262 | 5 | 6 | 31 | 8.94827556 | 6.42910051 |
| | | | 2 | 10 | 5.29150262 | 5 | 16 | | 8.94827556 | 6.42910051 |
| | | | 4 | −8 | 5.29150262 | 5 | 18 | | 8.94827556 | 6.42910051 |
| | | | 4 | 8 | 5.29150262 | 5 | 26 | | 8.94827556 | 6.42910051 |
| | | | 6 | −2 | 5.29150262 | 5 | 32 | | 8.94827556 | 6.42910051 |
| | | | 6 | 2 | 5.29150262 | 5 | 34 | | 8.94827556 | 6.42910051 |
| square root(31) | 0.3592106 | 121 | 1 | −11 | 5.56776436 | 6 | 1 | 42 | 7.58908947 | 7.57187779 |
| | | | 1 | 11 | 5.56776436 | 6 | 12 | | 7.58908947 | 7.57187779 |
| | | | 5 | −7 | 5.56776436 | 6 | 29 | | 7.58908947 | 7.57187779 |
| | | | 5 | 7 | 5.56776436 | 6 | 36 | | 7.58908947 | 7.57187779 |
| | | | 6 | −4 | 5.56776436 | 6 | 37 | | 7.58908947 | 7.57187779 |
| | | | 6 | 4 | 5.56776436 | 6 | 41 | | 7.58908947 | 7.57187779 |
| 6 | 0.33333333 | 127 | 0 | 12 | 6 | 6 | 6 | 43 | 7.58908947 | 7.57187779 |
| | | | 6 | −6 | 6 | 6 | 36 | | 7.58908947 | 7.57187779 |
| | | | 6 | 6 | 6 | 6 | 42 | | 7.58908947 | 7.57187779 |
| square root(37) | 0.32879797 | 139 | 3 | −11 | 6.08276253 | 6 | 14 | 43 | 7.58908947 | 7.57187779 |
| | | | 3 | 11 | 6.08276253 | 6 | 25 | | 7.58908947 | 7.57187779 |
| | | | 4 | −10 | 6.08276253 | 6 | 21 | | 7.58908947 | 7.57187779 |
| | | | 4 | 10 | 6.08276253 | 6 | 31 | | 7.58908947 | 7.57187779 |
| | | | 7 | −1 | 6.08276253 | 6 | 45 | | 7.58908947 | 7.57187779 |
| | | | 7 | 1 | 6.08276253 | 6 | 46 | | 7.58908947 | 7.57187779 |
| square root(39) | 0.32025631 | 151 | 2 | −12 | 6.244998 | 6 | 7 | 43 | 7.58908947 | 7.57187779 |
| | | | 2 | 12 | 6.244998 | 6 | 19 | | 7.58908947 | 7.57187779 |
| | | | 5 | −9 | 6.244998 | 6 | 28 | | 7.58908947 | 7.57187779 |
| | | | 5 | 9 | 6.244998 | 6 | 37 | | 7.58908947 | 7.57187779 |
| | | | 7 | −3 | 6.244998 | 6 | 44 | | 7.58908947 | 7.57187779 |
| | | | 7 | 3 | 6.244998 | 6 | 47 | | 7.58908947 | 7.57187779 |

-continued

| A | B | C | D | E | F | G | H | I | J | K |
|---|---|---|---|---|---|---|---|---|---|---|
| square root(43) | 0.30499714 | 163 | 1 | −13 | 6.55743852 | 7 | 1 | 56 | 6.58677555 | 8.71779789 |
| | | | 1 | 13 | 6.55743852 | 7 | 14 | | 6.58677555 | 8.71779789 |
| | | | 6 | −8 | 6.55743852 | 7 | 41 | | 6.58677555 | 8.71779789 |
| | | | 6 | 8 | 6.55743852 | 7 | 49 | | 6.58677555 | 8.71779789 |
| | | | 7 | −5 | 6.55743852 | 7 | 50 | | 6.58677555 | 8.71779789 |
| | | | 7 | 5 | 6.55743852 | 7 | 55 | | 6.58677555 | 8.71779789 |
| 4 square root(3) | 0.28867513 | 169 | 4 | −12 | 6.92820323 | 7 | 24 | 56 | 6.58677555 | 8.71779789 |
| | | | 4 | 12 | 6.92820323 | 7 | 36 | | 6.58677555 | 8.71779789 |
| | | | 8 | | 6.92820323 | 7 | 60 | | 6.58677555 | 8.71779789 |
| 7 | 0.28571429 | 185 | 8 | −2 | 7 | 7 | 59 | 56 | 6.58677555 | 8.71779789 |
| | | | 8 | 2 | 7 | 7 | 61 | | 6.58677555 | 8.71779789 |
| | | | 0 | 14 | 7 | 7 | 7 | | 6.58677555 | 8.71779789 |
| | | | 3 | −13 | 7 | 7 | 16 | | 6.58677555 | 8.71779789 |
| | | | 3 | −13 | 7 | 7 | 16 | | 6.58677555 | 8.71779789 |
| | | | 5 | −11 | 7 | 7 | 32 | | 6.58677555 | 8.71779789 |
| | | | 5 | 11 | 7 | 7 | 43 | | 6.58677555 | 8.71779789 |
| | | | 7 | −7 | 7 | 7 | 49 | | 6.58677555 | 8.71779789 |
| | | | 7 | 7 | 7 | 7 | 56 | | 6.58677555 | 8.71779789 |
| 2 square root(13) | 0.2773501 | 197 | 2 | −14 | 7.21110255 | 7 | 8 | 57 | 6.58677555 | 8.71779789 |
| | | | 2 | 14 | 7.21110255 | 7 | 22 | | 6.58677555 | 8.71779789 |
| | | | 6 | −10 | 7.21110255 | 7 | 40 | | 6.58677555 | 8.71779789 |
| | | | 6 | 10 | 7.21110255 | 7 | 50 | | 6.58677555 | 8.71779789 |
| | | | 8 | −4 | 7.21110255 | 7 | 58 | | 6.58677555 | 8.71779789 |
| | | | 8 | 4 | 7.21110255 | 7 | 62 | | 6.58677555 | 8.71779789 |

Table 2 shows the possible pattern orientations and the necessary (minimum) number of shifts or raw images for a checkerboard illumination pattern. Column A shows the pattern period in units of the minimum possible/resolvable period of lambda/(2*NA); column B shows the normalized pattern frequency; analogous to A, lambda/(NA*p); it can therefore be between 0 and 2 (edge of the OTF); column C shows the maximum number of frequency orders that a raw image can contain; columns D, E show the indices (D: m, E: n) which define the pattern frequencies as \vec k= sqrt(2)*pi/p*[m, n]; column F shows the magnitude of the respective frequency in units of the fundamental frequency 2pi/p (i.e., the value is always the same as in column A); column G shows the parameter kappa, which defines the pattern orientation as theta=arctan((1−kappa)/(1+kappa)); column H shows the phase shift of the respective frequency relative to the phase shift of k1 (the frequency in row 2). This value should never be 0; this condition defines the minimum value of kappa; column I shows the minimum number of raw images for a configuration or pattern period; column J shows the orientation angle of the pattern theta relative to the x-axis; column K shows the absolute travel distance of the pattern over N raw images in units of the pattern period p.

| A | B | C | D | E | F | G | H | I | J | K |
|---|---|---|---|---|---|---|---|---|---|---|
| 1 | 2 | 5 | 1 | 1 | 1 | 1 | 1 | 2 | 0 | 1.41421356 |
| | | | 1 | −1 | 1 | 1 | 1 | | 0 | 1.41421356 |
| square root(2) | 1.41421356 | 9 | 0 | 2 | 1.41421356 | 2 | −1 | 4 | −18.434949 | 2.23606798 |
| | | | 2 | 0 | 1.41421356 | 2 | 3 | | −18.434949 | 2.23606798 |
| 2 | 1 | 13 | 2 | 2 | 2 | 2 | 2 | 5 | −18.434949 | 2.23606798 |
| | | | −2 | 2 | 2 | 2 | 4 | | −18.434949 | 2.23606798 |
| square root(5) | 0.89442719 | 21 | 1 | −3 | 2.23606798 | 3 | 5 | 8 | −26.565051 | 3.16227766 |
| | | | 1 | 3 | 2.23606798 | 3 | −1 | | −26.565051 | 3.16227766 |
| | | | 3 | −1 | 2.23606798 | 3 | 7 | | −26.565051 | 3.16227766 |
| | | | 3 | 1 | 2.23606798 | 3 | 5 | | −26.565051 | 3.16227766 |
| 2 square root(2) | 0.70710678 | 25 | 0 | 4 | 2.82842712 | 3 | −4 | 9 | −26.565051 | 3.16227766 |
| | | | 4 | 0 | 2.82842712 | 3 | 8 | | −26.565051 | 3.16227766 |
| 3 | 0.66666667 | 29 | 3 | −3 | 3 | 3 | 9 | 10 | −26.565051 | 3.16227766 |
| | | | 3 | 3 | 3 | 3 | 3 | | −26.565051 | 3.16227766 |
| square root(10) | 0.63245553 | 37 | 2 | −4 | 3.16227766 | 4 | 11 | 14 | −30.963757 | 4.12310563 |
| | | | 2 | 4 | 3.16227766 | 4 | −1 | | −30.963757 | 4.12310563 |
| | | | 4 | −2 | 3.16227766 | 4 | 13 | | −30.963757 | 4.12310563 |
| | | | 4 | 2 | 3.16227766 | 4 | 7 | | −30.963757 | 4.12310563 |
| square root(13) | 0.5547002 | 45 | 1 | −5 | 3.60555128 | 4 | 10 | 15 | −30.963757 | 4.12310563 |
| | | | 1 | 5 | 3.60555128 | 4 | −5 | | −30.963757 | 4.12310563 |
| | | | 5 | −1 | 3.60555128 | 4 | 14 | | −30.963757 | 4.12310563 |
| | | | 5 | 1 | 3.60555128 | 4 | 11 | | −30.963757 | 4.12310563 |
| 4 | 0.5 | 49 | 4 | −4 | 4 | 4 | 16 | 15 | −30.963757 | 4.12310563 |
| | | | 4 | 4 | 4 | 4 | 4 | | −30.963757 | 4.12310563 |

-continued

| A | B | C | D | E | F | G | H | I | J | K |
|---|---|---|---|---|---|---|---|---|---|---|
| square root(17) | 0.48507125 | 57 | 3 | −5 | 4.12310563 | 5 | 19 | 18 | −33.690068 | 5.09901951 |
| | | | 3 | 5 | 4.12310563 | 5 | −1 | | −33.690068 | 5.09901951 |
| | | | 5 | −3 | 4.12310563 | 5 | 21 | | −33.690068 | 5.09901951 |
| | | | 5 | 3 | 4.12310563 | 5 | 9 | | −33.690068 | 5.09901951 |
| 3 square root(2) | 0.47140452 | 61 | 0 | 6 | 4.24264069 | 5 | −12 | 22 | −33.690068 | 5.09901951 |
| | | | 6 | 0 | 4.24264069 | 5 | 18 | | −33.690068 | 5.09901951 |
| 2 square root(5) | 0.4472136 | 69 | 2 | −6 | 4.47213595 | 5 | 18 | 23 | −33.690068 | 5.09901951 |
| | | | 2 | 6 | 4.47213595 | 5 | −6 | | −33.690068 | 5.09901951 |
| | | | 6 | −2 | 4.47213595 | 5 | 22 | | −33.690068 | 5.09901951 |
| | | | 6 | 2 | 4.47213595 | 5 | 14 | | −33.690068 | 5.09901951 |
| 5 | 0.4 | 81 | 1 | −7 | 5 | 5 | 17 | 24 | −33.690068 | 5.09901951 |
| | | | 1 | 7 | 5 | 5 | −11 | | −33.690068 | 5.09901951 |
| | | | 5 | −5 | 5 | 5 | 25 | | −33.690068 | 5.09901951 |
| | | | 5 | 5 | 5 | 5 | 5 | | −33.690068 | 5.09901951 |
| | | | 7 | 1 | 5 | 5 | 19 | | −33.690068 | 5.09901951 |
| | | | 7 | −1 | 5 | 5 | 23 | | −33.690068 | 5.09901951 |
| square root(26) | 0.39223227 | 89 | 4 | −6 | 5.09901951 | 6 | 29 | 32 | −35.537678 | 6.08276253 |
| | | | 4 | 6 | 5.09901951 | 6 | −1 | | −35.537678 | 6.08276253 |
| | | | 6 | −4 | 5.09901951 | 6 | 31 | | −35.537678 | 6.08276253 |
| | | | 6 | 4 | 5.09901951 | 6 | 11 | | −35.537678 | 6.08276253 |
| square root(29) | 0.37139068 | 97 | 3 | −7 | 5.38516481 | 6 | 28 | 33 | −35.537678 | 6.08276253 |
| | | | 3 | 7 | 5.38516481 | 6 | −7 | | −35.537678 | 6.08276253 |
| | | | 7 | −3 | 5.38516481 | 6 | 32 | | −35.537678 | 6.08276253 |
| | | | 7 | 3 | 5.38516481 | 6 | 17 | | −35.537678 | 6.08276253 |
| 4 square root(2) | 0.35355339 | 101 | 0 | 8 | 5.65685425 | 6 | −20 | 33 | −35.537678 | 6.08276253 |
| | | | 8 | 0 | 5.65685425 | 6 | 28 | | −35.537678 | 6.08276253 |
| square root(34) | 0.34299717 | 109 | 2 | −8 | 5.83095189 | 6 | 27 | 34 | −35.537678 | 6.08276253 |
| | | | 2 | 8 | 5.83095189 | 6 | −13 | | −35.537678 | 6.08276253 |
| | | | 8 | −2 | 5.83095189 | 6 | 33 | | −35.537678 | 6.08276253 |
| | | | 8 | 2 | 5.83095189 | 6 | 23 | | −35.537678 | 6.08276253 |
| 6 | 0.33333333 | 113 | 6 | −6 | 6 | 6 | 36 | 34 | −35.537678 | 6.08276253 |
| | | | 6 | 6 | 6 | 6 | 6 | | −35.537678 | 6.08276253 |
| square root(37) | 0.32879797 | 121 | 5 | −7 | 6.08276253 | 7 | 41 | 39 | −36.869898 | 7.07106781 |
| | | | 5 | 7 | 6.08276253 | 7 | −1 | | −36.869898 | 7.07106781 |
| | | | 7 | −5 | 6.08276253 | 7 | 43 | | −36.869898 | 7.07106781 |
| | | | 7 | 5 | 6.08276253 | 7 | 13 | | −36.869898 | 7.07106781 |
| 2 square root(10) | 0.31622777 | 129 | 4 | −8 | 6.32455532 | 7 | 40 | 39 | −36.869898 | 7.07106781 |
| | | | 4 | 8 | 6.32455532 | 7 | −8 | | −36.869898 | 7.07106781 |
| | | | 8 | −4 | 6.32455532 | 7 | 44 | | −36.869898 | 7.07106781 |
| | | | 8 | 4 | 6.32455532 | 7 | 20 | | −36.869898 | 7.07106781 |
| square root(41) | 0.31234752 | 137 | 1 | −9 | 6.40312424 | 7 | 31 | 45 | −36.869898 | 7.07106781 |
| | | | 1 | 9 | 6.40312424 | 7 | −23 | | −36.869898 | 7.07106781 |
| | | | 9 | −1 | 6.40312424 | 7 | 39 | | −36.869898 | 7.07106781 |
| | | | 9 | 1 | 6.40312424 | 7 | 33 | | −36.869898 | 7.07106781 |
| 3 square root(5) | 0.2981424 | 145 | 3 | −9 | 6.70820393 | 7 | 39 | 46 | −36.869898 | 7.07106781 |
| | | | 3 | 9 | 6.70820393 | 7 | −15 | | −36.869898 | 7.07106781 |
| | | | 9 | −3 | 6.70820393 | 7 | 45 | | −36.869898 | 7.07106781 |
| | | | 9 | 3 | 6.70820393 | 7 | 27 | | −36.869898 | 7.07106781 |
| 7 | 0.28571429 | 149 | 7 | −7 | 7 | 7 | 49 | 46 | −36.869898 | 7.07106781 |
| | | | 7 | 7 | 7 | 7 | 7 | | −36.869898 | 7.07106781 |
| 5 square root(2) | 0.28284271 | 161 | 0 | 10 | 7.07106781 | 8 | −35 | 52 | −37.874984 | 8.06225775 |
| | | | 10 | 0 | 7.07106781 | 8 | 45 | | −37.874984 | 8.06225775 |
| | | | 6 | −8 | 7.07106781 | 8 | 55 | | −37.874984 | 8.06225775 |
| | | | 6 | 8 | 7.07106781 | 8 | −1 | | −37.874984 | 8.06225775 |
| | | | 8 | −6 | 7.07106781 | 8 | 57 | | −37.874984 | 8.06225775 |
| | | | 8 | 6 | 7.07106781 | 8 | 15 | | −37.874984 | 8.06225775 |
| 2 square root(13) | 0.2773501 | 169 | 2 | −10 | 7.21110255 | 8 | 44 | 53 | −37.874984 | 8.06225775 |
| | | | 2 | 10 | 7.21110255 | 8 | −26 | | −37.874984 | 8.06225775 |
| | | | 10 | −2 | 7.21110255 | 8 | 52 | | −37.874984 | 8.06225775 |
| | | | 10 | 2 | 7.21110255 | 8 | 38 | | −37.874984 | 8.06225775 |

-continued

| A | B | C | D | E | F | G | H | I | J | K |
|---|---|---|---|---|---|---|---|---|---|---|
| square root(53) | 0.27472113 | 177 | 5 | −9 | 7.28010989 | 8 | 54 | 53 | −37.874984 | 8.06225775 |
|  |  |  | 5 | 9 | 7.28010989 | 8 | −9 |  | −37.874984 | 8.06225775 |
|  |  |  | 9 | −5 | 7.28010989 | 8 | 58 |  | −37.874984 | 8.06225775 |
|  |  |  | 9 | 5 | 7.28010989 | 8 | 23 |  | −37.874984 | 8.06225775 |
| square root(58) | 0.26261287 | 185 | 4 | −10 | 7.61577311 | 8 | 53 | 60 | −37.874984 | 8.06225775 |
|  |  |  | 4 | 10 | 7.61577311 | 8 | −17 |  | −37.874984 | 8.06225775 |
|  |  |  | 10 | −4 | 7.61577311 | 8 | 59 |  | −37.874984 | 8.06225775 |
|  |  |  | 10 | 4 | 7.61577311 | 8 | 31 |  | −37.874984 | 8.06225775 |

The above calculations show that the smaller the fill factor becomes, the less "negligible" the frequencies become with a larger amount. This means that in many cases—provided that the correct phase steps are always used—it may be possible to use a few images less in order to obtain artifact-free images. If very few images are acquired, i.e., few positions of the sample are scanned, only 1 or 2 and, for an extremely small amount of images, the 3 hexagon frequencies will remain as a raster.

In some embodiments of the present invention, in order to interpolate the interference signal over the entire image field in a raw image from the regions outside the (illumination) islands, a filter kernel specially adapted to the problem can be used.

Figure 14A:
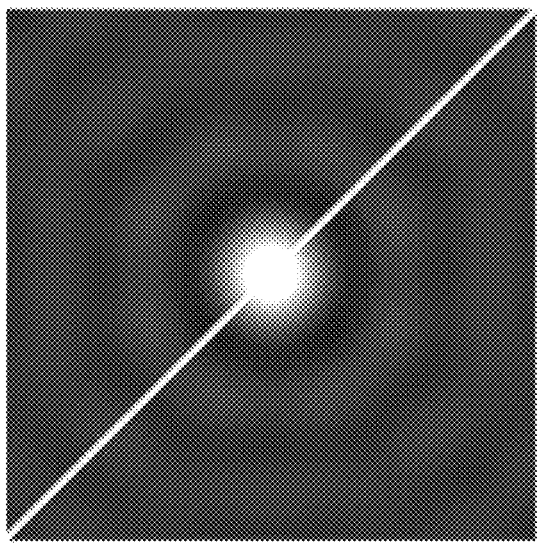
Figure 14B:
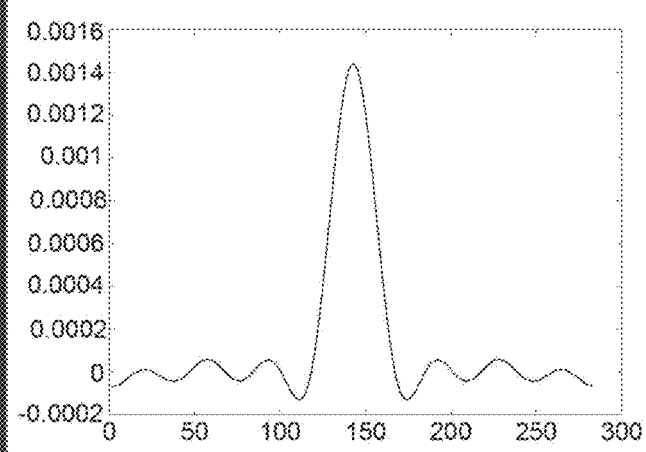
Figure 15A:
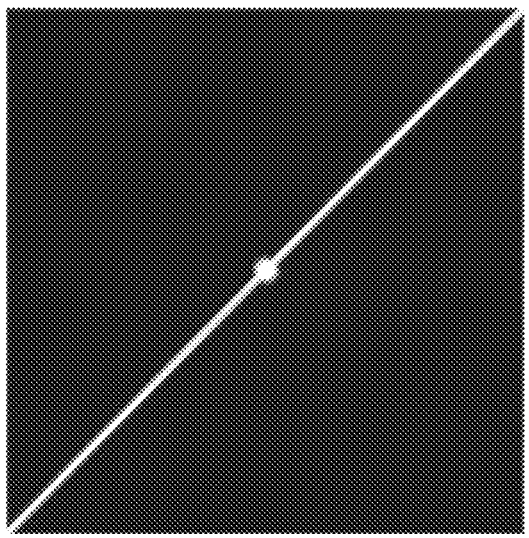
Figure 15B:
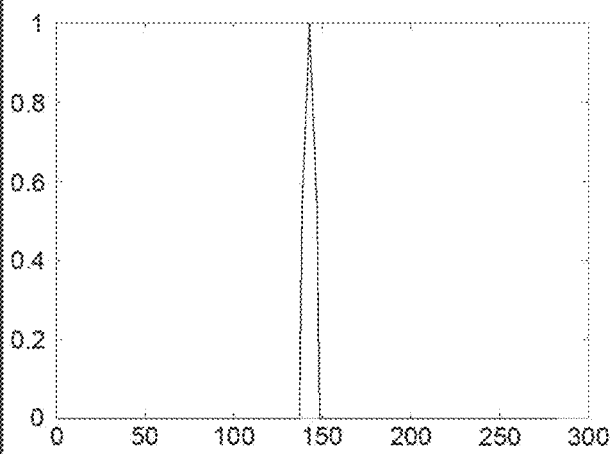

FIGS. 14(A) and 14(B) and 15(A) and 15(B) show a simple low-pass filter of the prior art—i.e. a slightly apodized circular function in Fourier space (FIGS. 15(A) and 15(B)) as the most obvious solution; here, too, Figure "A" shows the image data and Figure "B" the signal intensity along the white line in Figure "a" as a line plot. FIGS. 14(A) and 14(B) show the filter (i.e., the convolution kernel) in spatial space, and FIGS. 15(A) and 15(B) show the low-pass filter in Fourier space. In this context, the interference signal is interpolated exclusively from the low-frequency components of the measured raw image. This has the disadvantage that, in the case of very bright points or large differences in brightness in the sample, the lateral extensions of the corresponding convolution kernel (shown in FIG. 14a) can result in what is known as "ringing artifacts" (see FIG. 18(A)).

Figure 16A:
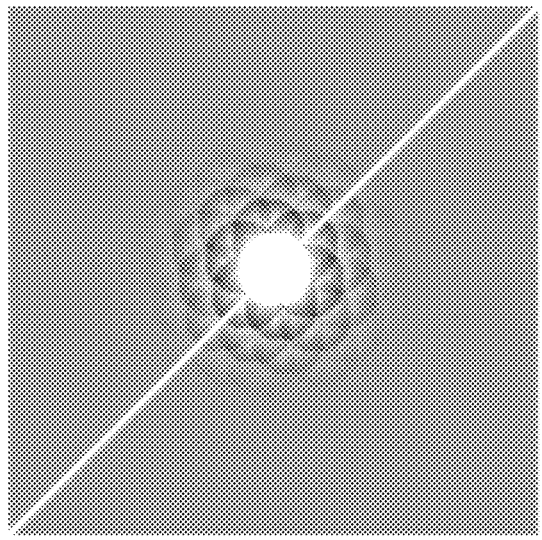
Figure 16B:
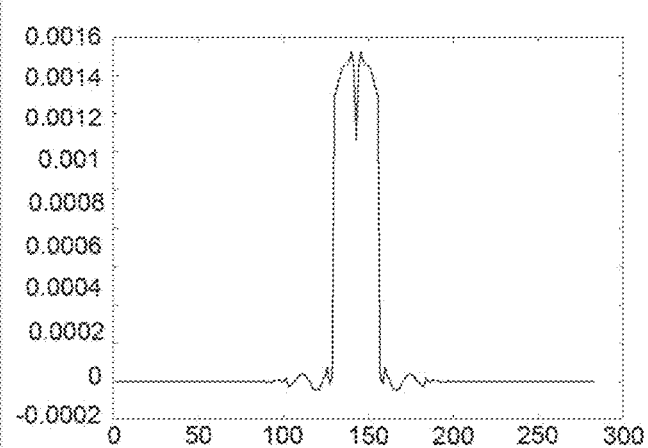
Figure 17A:
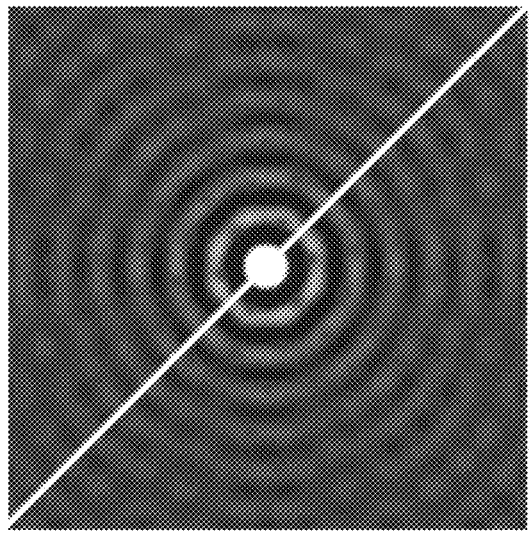
Figure 17B:
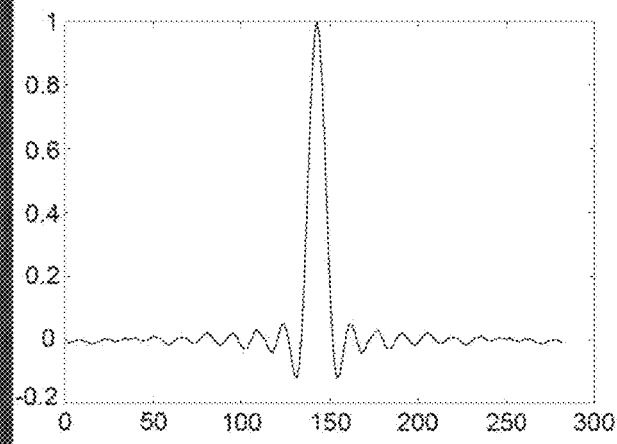

To avoid this, instead of a low-pass filter in frequency space, it is possible to start out from a circular function in spatial space, as shown in FIGS. 16(A) and 16(B) and 17(A) and 17(B), where FIGS. 16(A) and 16(B) show the convolution kernel in spatial space and FIGS. 17(A) and 17(B) show the corresponding filter in Fourier space. Even if a sufficiently large diameter is chosen for the circular function (i.e., larger than the period of the hexagon), this filter is not suitable for removing the hexagonal or checkerboard pattern from the interference signal. To additionally achieve this, the filter in Fourier space is additionally provided with a frequency filter that is adapted to the frequencies contained in the respective excitation pattern. This results in a convolution kernel that both can completely remove the pattern from the interference signal images (i.e. interpolate the interference signal) and completely eliminates the above-described ringing problem of the low-pass filter.

Figure 18A:
Figure 18B:
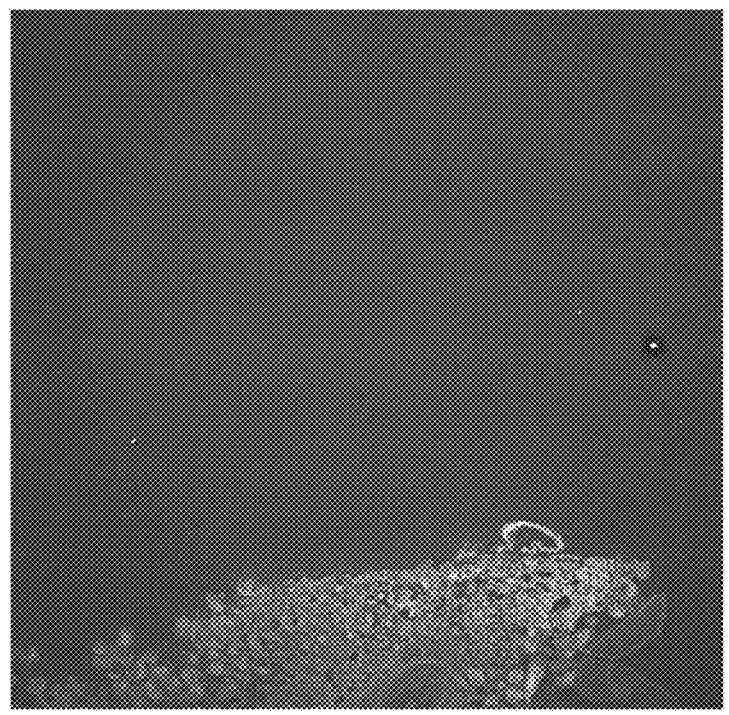

FIGS. 18(A) and 18(B) show a comparison of the use of a convolution kernel or low-pass filter, as described in FIGS. 14(A) and 14(B) and 15(A) and 15(B), in FIG. 18(A), with the use of a convolution kernel or low-pass filter as described in FIGS. 16(A) and 16(B) and 17(A) and 17(B) and an adapted convolution kernel/Fourier filter in FIG. 18(B).

The scope of this disclosure includes all changes, substitutions, variations, alterations and modifications to the embodiments described or illustrated herein that would be understood by one of ordinary skill in the art. The scope of protection of this disclosure is not limited to the embodiments described or illustrated herein. Moreover, although this disclosure describes and illustrates the particular embodiments herein as comprising particular components, elements, features, functions, operations, or steps, any of these embodiments may comprise any combinations or permutations of any components, elements, features, functions, operations, or steps described or illustrated at any point herein that would be understood by one of ordinary skill in the art. Any reference made in the appended claims to a method or device or component of a device or a system being adapted, arranged, capable, configured, enabled, operable or ready to perform a particular function also includes that device, system or component, regardless of whether it or that particular function is enabled, active or released, so long as that device, system or component is adapted, arranged, capable, configured, enabled, operable or ready to perform that particular function. Moreover, although this disclosure describes or illustrates particular embodiments as providing certain advantages, particular embodiments may also provide none, some, or all of these advantages.

What is claimed is:

1. A method for generating microscopic layer images of 3-dimensional fluorescent objects in a sample, the method comprising:
    illuminating at least a first region of the sample with a regular illumination pattern formed by a plurality of light islands, wherein the light islands in the illumination pattern are arranged with such spacing that the excitation intensity outside the island regions in the focus of the microscope's objective approaches zero;
    detecting the emission signal emitted by the sample to generate a raw image of the first region of the sample;
    wherein the following process steps are applied to the raw image:
        interpolation of first interference signals that originate from regions outside the emission signals corresponding to the illumination islands;
        generating a 2-dimensional interference signal map from the interpolated interference signals; and
        generating an emission image, freed from interference signals, of the object illuminated in the pattern grid by subtracting the 2-dimensional interference signal map from the detected emission signal.

2. The method of claim 1, wherein the illumination pattern is selected such that the signal-to-noise ratio is optimized depending on the sample.

3. The method of claim 1, further comprising repeatedly shifting the illumination pattern relative to the sample or the sample relative to the illumination pattern, while maintaining the focal plane for illuminating a further region of the sample, and repeating the method at the respective new position of the illumination pattern relative to the sample.

4. The method of claim 3, further comprising repeated shifting until the minimum number of shifts is reached, until all regions of the sample have been illuminated at least once.

5. The method of claim 1, wherein the illumination pattern is selected in such a way that the spacing between the illumination islands is optimized with respect to a predetermined number of images to be acquired and a predetermined contrast.

6. The method of claim 1, further comprising additively combining the emission images freed from interfering signals to form a layer image of the sample in the respective focal plane.

7. The method of claim 1, wherein a measured emission signal for each individual position of the illumination pattern on the sample is compared with an emission signal calculated using the point-spread function of the microscope used, and second interference signals are determined based on the difference between the two signals.

8. The method of claim 7, wherein the interference signal is further reduced by iterative deconvolution by iteratively calculating, in addition to the object signal from the islands, also the excitation intensities in the raw images, the iteration cycles for object signals and excitation intensities alternating in each case.

9. The method of claim 1, wherein interference signals are determined with the inclusion of adjacent focal planes.

10. The method of claim 1, wherein the area of the illumination islands in the focal plane is between 5 and 20% of the total area illuminated by the pattern in a measuring process.

11. A device for generating microscopic layer images of 3-dimensional fluorescent objects in a sample, the device comprising:
- an objective;
- an illumination unit for illuminating the sample in the form of an illumination pattern formed by a plurality of light islands, wherein the light islands in the illumination pattern are arranged with such spacing that the excitation intensity outside the island regions in the focus of the microscope's objective approaches zero;
- a detector for detecting an emission signal emitted by the sample;
- an arrangement for shifting the illumination pattern relative to the sample or the sample relative to the illumination pattern;
- and at least one control unit configured to carry out a method according to the following steps:
  - illuminating at least a first region of the sample with a regular illumination pattern formed by a plurality of light islands, wherein the light islands in the illumination pattern are arranged with such spacing that the excitation intensity outside the island regions in the focus of the microscope's objective approaches zero;
  - detecting the emission signal emitted by the sample to generate a raw image of the first region of the sample;
- wherein the following process steps are applied to the raw image:
  - interpolation of first interference signals that originate from regions outside the emission signals corresponding to the illumination islands;
  - generating a 2-dimensional interference signal map from the interpolated interference signals; and
  - generating an emission image, freed from interference signals, of the object illuminated in the pattern grid by subtracting the 2-dimensional interference signal map from the detected emission signal.

12. A non-transitory computer-readable storage medium that includes instructions which, when executed by a computer, cause the computer to perform a method controlling a device for generating microscopic layer images of 3-dimensional fluorescent objects in a sample according to the following steps:
- illuminating at least a first region of the sample with a regular illumination pattern formed by a plurality of light islands, wherein the light islands in the illumination pattern are arranged with such spacing that the excitation intensity outside the island regions in the focus of the microscope's objective approaches zero;
- detecting the emission signal emitted by the sample to generate a raw image of the first region of the sample;
- wherein the following process steps are applied to the raw image:
  - interpolation of first interference signals that originate from regions outside the emission signals corresponding to the illumination islands;
  - generating a 2-dimensional interference signal map from the interpolated interference signals; and
  - generating an emission image, freed from interference signals, of the object illuminated in the pattern grid by subtracting the 2-dimensional interference signal map from the detected emission signal.

* * * * *